United States Patent [19]

Spratt et al.

[11] 4,301,645
[45] Nov. 24, 1981

[54] TOBACCO HARVESTING METHOD AND APPARATUS

[75] Inventors: Donald E. Spratt, Spring & Summer Sts., Weston, Mo. 64098; Franklin D. Spratt, Lake Jackson, Tex.

[73] Assignee: Donald E. Spratt, Weston, Mo.

[21] Appl. No.: 118,780

[22] Filed: Feb. 5, 1980

Related U.S. Application Data

[62] Division of Ser. No. 946,820, Sep. 28, 1978, Pat. No. 4,216,642.

[51] Int. Cl.³ ............................................. A01D 45/16
[52] U.S. Cl. ...................................... 56/27.5; 56/83; 105/269; 298/13; 414/409
[58] Field of Search ................... 414/409; 298/13.12; 105/268, 269; 56/27.5, 83–89

[56] References Cited

U.S. PATENT DOCUMENTS

| | | | |
|---|---|---|---|
| 538,938 | 5/1895 | Van Pelt | 105/269 |
| 594,246 | 11/1897 | Gorton | 56/83 |
| 1,533,453 | 4/1925 | Paynter | 298/13 |
| 2,477,068 | 7/1949 | La Motte | 56/27.5 |
| 2,693,070 | 11/1954 | Gaut et al. | 56/27.5 |

*Primary Examiner*—Paul J. Hirsch
*Attorney, Agent, or Firm*—Schmidt, Johnson, Hovey & Williams

[57] ABSTRACT

Tobacco plants are harvested by having an operator ride a harvesting vehicle along a plant row so that as plants are successively cut from the ground by a cutter on the vehicle, the operator may grasp the severed plant and impale the same onto an upright stake likewise carried by the vehicle. As the stake becomes loaded with plants, the operator may remove the loaded stake from its holding socket on the vehicle and lay the same on a rearwardly disposed deck. He then replaces the loaded stake with an empty stake obtained from a supply thereof carried by the vehicle, and repeats the cutting, impaling and replacement steps until a sufficiently large accumulation of loaded stakes has been obtained on the deck. Thereupon, the deck is tilted to an inclined position so as to dump the plant-loaded stakes onto the ground in a pile, whereupon the cycle is repeated.

3 Claims, 8 Drawing Figures

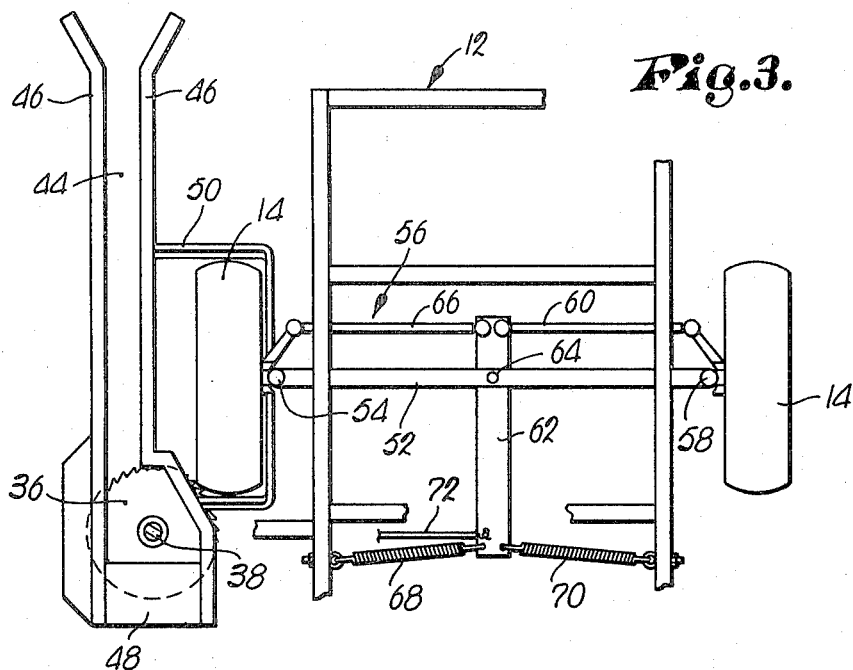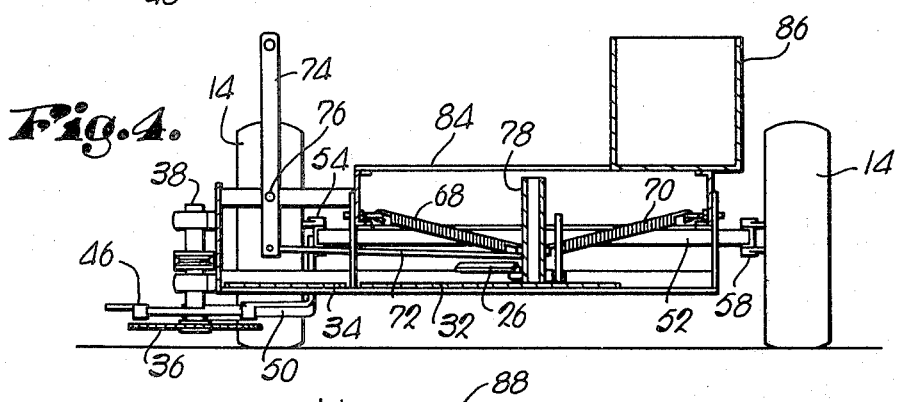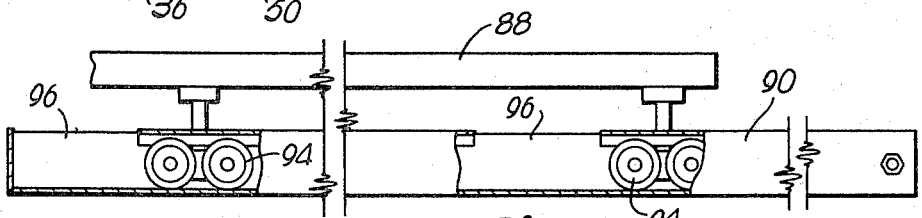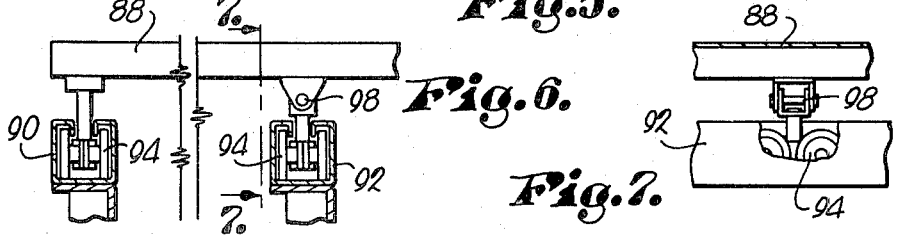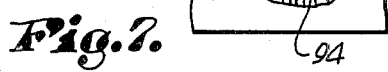

TOBACCO HARVESTING METHOD AND APPARATUS

This is a division of application Ser. No. 946,820, filed on Sept. 28, 1978 now U.S. Pat. No. 4,216,642.

TECHNICAL FIELD

This invention relates to the harvesting of whole tobacco plants as opposed to the picking of leaves from such plants from their stalks. Typically, the tobacco plants harvested via the method and apparatus of the present invention are burley tobacco plants, although it will be apparent from the description which follows that the principles of the present invention are not limited to that particular species.

BACKGROUND ART

The harvesting technique for whole tobacco plants has remained virtually unchanged since early colonial days. Typically, tobacco is planted in rows and the harvesting is done manually during the hot summer days of late August by workers using a hatchet-like knife with a handle about twelve inches long having a thin, sharp blade attached to one end. A stick about fifty inches long and one-inch square is stuck into the ground and a cone-shaped, sharp, metal spear is placed on the upper end of the stick. The worker stands near the stick and cuts each plant near the ground level with the knife. He then raises the plant to head height, then lowers it quickly to impale the stalk of the plant onto the spear at a point about six or seven inches above the butt of the plant. The stalk is then pushed down toward the bottom of the stick to make room for the next plant, and this operation is repeated until there are approximately one-half dozen plants on the stick, depending upon the size of the plants.

In cutting the plants from the ground, the worker must grasp the plant with one hand, cut the plant with the knife in the other hand, turn bodily toward the stick and impale the plant upon the spear. Since the worker is in a variety of locations and postures while making his harvesting cut, his relative position to the stick and its spear is constantly changing, making it difficult for him to accurately and consistently bring the relatively thin stalk of the plant down upon the point of the spear. Frequently, the stick will tilt to one side due to wind or terrain inequalities. Moreover, unless the worker can consistently push the plants down onto the stick in the same direction for each plant, he may unwittingly change the location of the stick. Obviously, such is a dangerous situation leading to potentially serious injury to the worker as he attempts to impale the plants onto the spear. Furthermore, there is always the danger of the worker injuring himself with the knife as he attempts to make the harvesting cut.

The plant-laden sticks remain in their original position throughout the day until, just before nightfall, the workers accumulate the plant-laden sticks into piles of about ten sticks per pile. This will protect the plants from overnight damage due to rain or wind and also allows the plants to wilt. The pressure from having the plants piled on top of one another flattens out the plants so that the thickness of each plant-laden stick becomes less, making it subsequently easier to handle in the curing barns. As is apparent, this accumulation of plant-laden sticks into piles is carried out after many hours of hard labor in the hot sun.

Before the workers begin the actual harvesting process, it is necessary to distribute the supply of sticks at strategic locations in the field of plants to be harvested. Each stick weighs approximately one pound, and the worker distributing the sticks in the field will generally begin the operation by lifting about fifty of the sticks onto his shoulder and then walking between the rows to drop one stick for each five or six plants to be harvested. This in itself can be a tedious and difficult job because typically, the terrain is not smooth, the leaves of plants generally overlap from row to row so that the worker cannot clearly see the uneven terrain on which he is walking, and many of the plants do not stand perfectly upright, all of which contribute to making the operation tedious and difficult.

While in certain instances vehicles have been used to carry the sticks and a team of two persons have been employed, one to drive the vehicle and one to deposit the sticks in their proper positions, such an operation risks serious damage to the plant leaves and thus is not desirable from this standpoint.

Hence, it is more than abundantly clear that there is and has been a striking, long felt need for improvements in harvesting method and apparatus for whole tobacco plants, and it is toward fulfillment of this need that the present invention is directed.

SUMMARY OF THE INVENTION

The present invention solves the problem of finding sufficiently skilled and physically capable laborers for carrying out the old classical harvesting operation, because, with the present invention, a single operator can accomplish in less time and in greater safety what previously required several laborers to accomplish. The safety factor is increased to the point that only extreme carelessness could possibly result in injury, and the physical strength requirements of the person doing the harvesting according to the present invention are substantially reduced so that it is significantly easier to find a person physically qualified to do the job.

In accordance with the present invention, an operator rides a vehicle along a row of the plants to be harvested, and a pointed stake is positioned on the vehicle with the point of the stake positioned upwardly. A cutter on the vehicle automatically severs the plants in succession as the vehicle moves along the row, and as each plant is severed, the operator grabs the plant, turns slightly, and impales it onto the stake. This is repeated until the stake is loaded with a preselected number of the plants.

Thereupon, the operator lifts the plant-laden stake out of its retaining socket and places the same on a rearwardly disposed deck for accumulation with other similarly laden stakes. The operator then takes an empty stake from a supply of replacement stakes on the vehicle and inserts it into the socket to resume the harvesting operation. A foot control may be used to interrupt advancement of the vehicle if necessary during any point in the harvesting operation.

After a predetermined quantity of the plant-laden stakes have accumulated on the rear deck, the operator stops the vehicle and tilts the deck downwardly and rearwardly so as to dump the load onto the ground. The deck is thereupon releveled, and the cycle is repeated until the field has been fully harvested.

BRIEF DESCRIPTION OF THE DRAWINGS

FIG. 3 is a fragmentary top plan view of the front end of the vehicle illustrating details of the row guidance mechanism;

FIG. 4 is a transverse, vertical, cross-sectional view of the vehicle taken substantially along line 4—4 of FIG. 1;

FIG. 5 is an enlarged, partially elevational and partially cross-sectional view of the mounting structure for the rear deck and illustrating cooperation between the transversely extending tracks and followers associated with the deck;

FIG. 6 is a fragmentary, enlarged, longitudinal cross-sectional view through the rear of the vehicle, again illustrating details of the mounting structure for the rear deck;

FIG. 7 is a fragmentary cross-sectional view of the deck mounting structure taken substantially along line 7—7 of FIG. 6.

DETAILED DESCRIPTION

Figure 1:
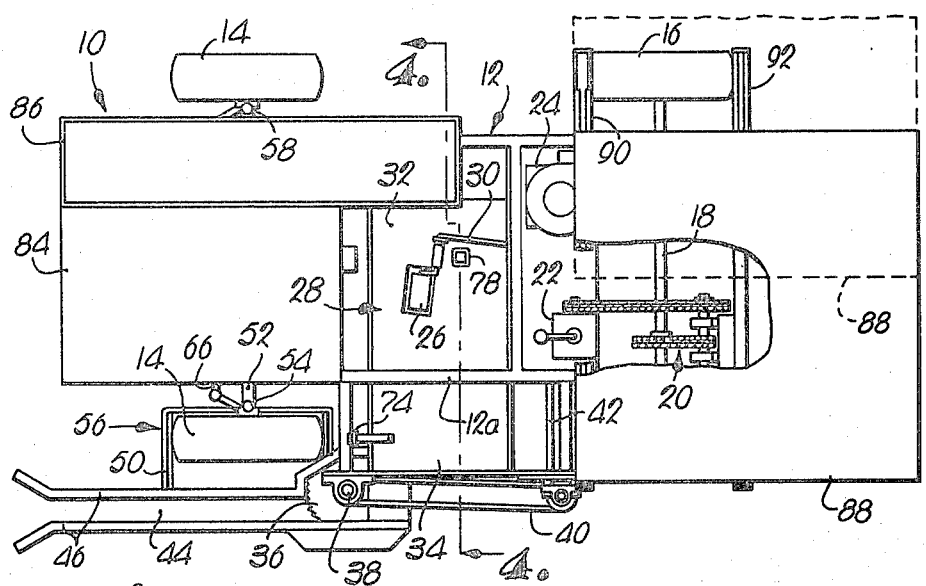
FIG. 1 is a top plan view of a harvesting vehicle constructed in accordance with the principles of the present invention, the rear deck thereof being partially broken away to show details of construction, and phantom line being used to denote a laterally shifted position of the deck for dumping purposes.

The vehicle 10 has a chassis 12 supported by front and rear ground-engaging wheels 14 and 16 respectively. The rear wheels 16 are interconnected by an axle 18 which is driven via a speed reduction train 20 ultimately connected to a transmission 22 which in turn is connected via belts and pulleys (not shown) to a motor 24. A foot pedal 26 on the floor of an operator's station 28 forwardly of the engine 24 and the transmission 22 is connected to the engine 24 via linkage 30 for speed control purposes.

Figure 8:
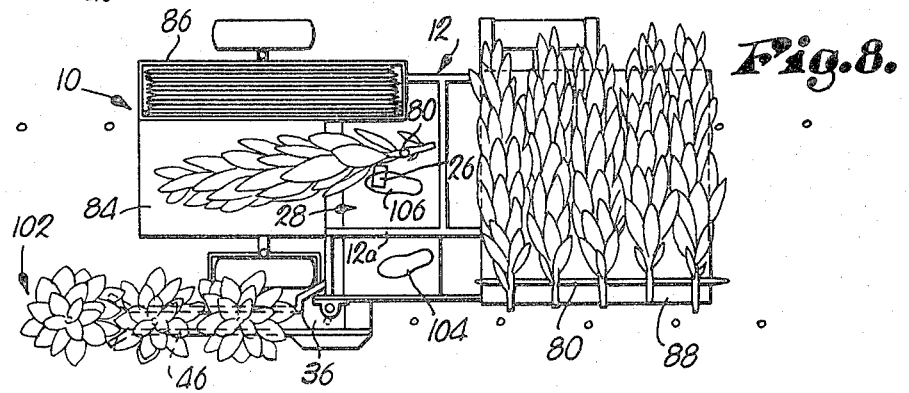
FIG. 8 is a top plan view of the vehicle on a reduced scale illustrating the way in which the harvesting method of the present invention is carried out.

The operator's station 28 is disposed substantially in the middle of the vehicle 10 in a fore-and-aft direction and includes a pair of floor plates 32 and 34 respectively, the plate 34 being disposed laterally outboard of a fore-and-aft extending structural member 12a of the chassis 12 and both of the plates 32 and 34 being disposed substantially below such member 12a. As illustrated in FIG. 8, the operator simply straddles the member 12a with his feet on opposite ones of the plates 32 and 34 during field operation.

In addition to the drive wheels 16, the engine 24 is also used to drive a disc cutter 36 having a saw toothed periphery. The cutter 36 is disposed slightly laterally outboard of the operator's station 28 and slightly forwardly thereof for rotation in a horizontal plane about an upright axis defined by its drive shaft 38. The shaft 38 receives input power via a fore-and-aft extending belt 40 and a laterally extending belt 42. The cutter 36 is positioned close to the ground as illustrated most clearly in FIGS. 2 and 4 and is located at the rearmost end of a stalk entry passage 44 defined between a pair of fore-and-aft extending, forwardly flared, laterally spaced apart guide rails 46.

The guide rails 46 are structurally tied together via suitable members such as the rear plate 48 shown in FIG. 3, and as also shown in that same figure, the rails 46 are then secured to the chassis 12 via a generally U-shaped structural member 50 looped around the left front wheel 14. The structural member 50 in turn carries the left front wheel 14 and is attached to the laterally outboard end of cross member 52 of the chassis 12 by an upright pivot 54. Hence, the guide rails 46, the U-shaped structural member 50 and the left front wheel 14 all become part of a common unit attached to the chassis 12 via the upright pivot 54 for horizontal swinging movement. Note that the cutter 36 does not swing with the guide rails 46 but rather remains stationarily disposed by virtue of its shaft 38 which is connected to the chassis 12 in a fixed relationship.

The guide rails 46 and the U-shaped structural member 50 not only serve the purposes hereinabove set forth, but also function as part of vehicle guidance mechanism broadly denoted by the numeral 56. In this regard, the right front wheel 14 is pivoted to the right laterally outboard end of the cross member 52 via an upright pivot 58. Steering linkage 60 from the right front wheel 14 extends inboard to a connection point at the front end of a centrally disposed, fore-and-aft extending lever 62 having its own upright pivot 64 with the cross member 52. Likewise, steering linkage 66 extends inwardly from the U-shaped structural member 50 for connection to the forwardmost end of the lever 62. Linkages 60 and 66 are of equal lengths so as to maintain the wheels 14 in parallelism with one another in all positions of their swinging movements about pivots 54 and 58.

At the rear of the lever 62, a pair of tension springs 68 and 70 extend to adjacent portions of the chassis 12 so as to yieldably maintain the lever 62 in its illustrated "home" position wherein the front wheels 14 are disposed for straight ahead travel by the vehicle 10. A rod 72 leads leftwardly from the rear end of the lever 62 to a position near the center of the floor plate 34 where it is connected to the lowermost end of an upright arm 74 pivoted intermediate its ends to the chassis 12 via fore-and-aft extending pivot 76. The upper end of the arm 74 is in a position where it can be grasped by an operator at the operator's station 28 so as to permit overriding of the springs 68 and 70 for the purpose of manually steering the vehicle 10. Otherwise, the vehicle 10 is steered via the interaction of the guide rails 46 with the plants as will hereinafter be described in more detail.

The plate 32 is provided with an upstanding socket 78 positioned slightly to the right side of the area of the operator's station 28 normally occupied by the operator. The socket 78 is adapted to removably receive a stake 80 having an uppermost end fitted with a suitable sharp point such as may be provided by a metal tip 82. The stake 80 extends well above the floor plate 32 and is preferably approximately fifty inches in length.

A forward deck 84 is supported by the chassis 12 across the front of the vehicle 10 at a level just slightly above the uppermost end of the socket 78, the deck 84 extending forwardly from the front termination of the floor plate 32 to the forwardmost extremity of the vehicle 10, although it is of course understood that the deck 84 is located several inches above the floor plate 32. As will hereinafter be described, the deck 84 is thus positioned to help support the tobacco plants as they are retained by the stake 80.

An open top receptacle 86 of rectangular configuration is positioned to the right of the forward deck 84 along the length of the latter between the forwardmost extremity of the vehicle 10 and the midpoint of the latter as defined by the position of the socket 78. The receptacle 86 has a sufficient fore-and-aft length to permit reception and accmulation of a supply of stakes 80 therein for advancement with the vehicle 10 during field operation.

Behind the operator's station 28 and at a level almost half way up the stake 80 is disposed a rear deck 88 extending in a fore-and-aft direction from a point directly above the motor 24 to a rearmost point substantially rearwardly of the rear wheels 16. The deck 88 is of rectangular configuration as viewed in plan and is supported on the chassis 12 by a pair of transversely extending, fore-and-aft spaced apart tracks 90 and 92, details of which may be seen in FIGS. 5, 6 and 7. Each of the tracks 90, 92 is essentially tubular and receives a corresponding, transversely spaced pair of followers 94 which depend from the lower surface of the deck 88. Hence, the deck 88 is positioned for lateral shifting movement relative to the path of travel of the vehicle 10 between a normal "in-line" position as shown in solid lines in FIG. 1 and a laterally disposed, rightwardly outboard position as illustrated in phantom lines in FIG. 1.

Figure 2:
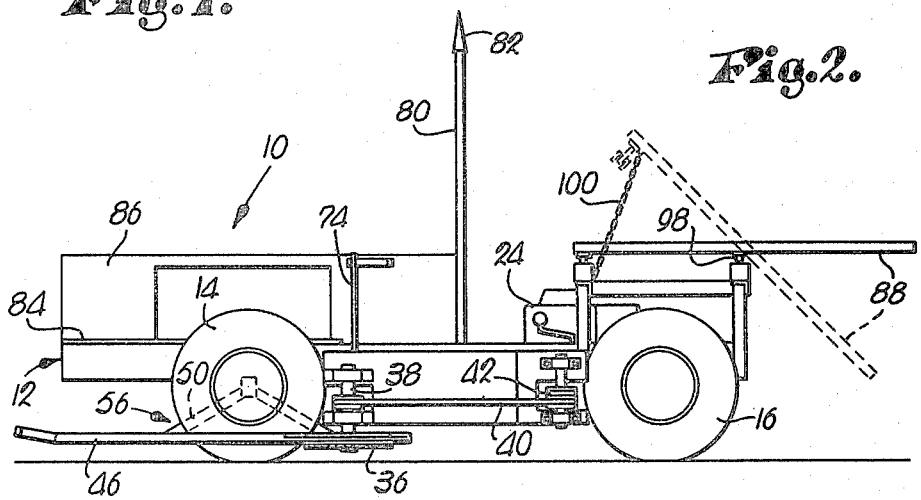
FIG. 2 is a side elevational view of the vehicle with phantom lines indicating the rear dump position of the deck.

The forward track 90 is provided with a pair of openings 96 as shown in FIG. 5 which are disposed to register with the forward followers 94 when the deck 88 is in its rightwardly outboard position. Such forwardly facing openings 96 in the front track 90 thus permit the front followers 94 to leave the track 90 when the deck 88 is in its rightwardly outboard position and is tipped downwardly and rearwardly by virtue of its transverse, pivotal connection 98 with the rear followers 94. Thus, as shown in FIG. 2, the deck 88 is disposed for swinging movement between the horizontal load supporting position illustrated in solid lines and the downwardly and rearwardly inclined dumping position illustrated in phantom lines, the center of gravity of the deck 88 being disposed rearwardly of the pivots 98 so that the deck 88 will automatically swing by gravity to its dumping position when the front followers 94 are positioned in alignment with the openings 96 in the front track 90. Note that a limit chain 100 may be employed between the forward end of the deck 88 and the chassis 12 as shown in FIG. 2 to limit the extent of downward and rearward swinging of the deck 88.

OPERATION

Fundamentals of how the vehicle 10 is placed in use may be observed by reference to FIG. 8. As therein illustrated, the vehicle 10 is advanced across a field in parallel relationship to the rows of plants to be harvested. The operator stands at the operator's station 28 straddling the chassis member 12a with his left foot 104 on the floor plate 34 and his right foot 106 on the floor plate 32, the front portion of his right foot 106 being applied against the pedal 26 so as to control the speed of advancement of the vehicle 10. The vehicle 10 is positioned with the guide rails 46 in registration with a row of the plants 102 to be harvested, and the foot pedal 25 is depressed such as to move the vehicle forwardly and cause the plants of row 102 to become successively received within the passage 44 between guide rails 46.

As the vehicle 10 advances, the standing plants of row 102 are successively severed by the rotating disc cutter 36. As a plant is being severed from the ground by the cutter 36, the operator grasps the plant and, upon complete severance, lifts it from the cutter 36, turns slightly to his right, orients the plant so that the butt of the stalk is facing rearwardly, and impales the stalk down onto the stake 80 through its point 82. Once the plant has been impaled on the stake 80, the operator pushes the plant sufficiently far downwardly along the stake 80 to allow the forwardly disposed majority of the plant to come to rest upon the front deck 84 as illustrated in FIG. 8. The operator then turns his attention to the next plant between the rails 46 which by this time is being severed by the cutter 36 and is ready for his attention.

When five or six of the plants have been impaled upon the stake 80, the operator lifts his foot from the pedal 26 to stop the vehicle 10, and he removes the plant-laden stake 80 from the socket 78 and lays the same on the rear deck 88 in such a manner that the stake 80 lies along the left margin of the deck 88 generally parallel to the path of travel of the vehicle 10 so that the plants extend transversely across the deck 88 as illustrated in FIG. 8. Pivoting forwardly, the operator then reaches into the receptacle 86 for a new stake and places it in the socket 78 with the point 82 disposed upwardly. Depressing the foot pedal 26 resumes advancement of the vehicle 10 so that the next batch of plants can be severed and placed on to the new stake 80. When the new stake 80 is filled, it is removed from the socket 78 and laid on top of the previous stake and plants on the rear deck 88, the foregoing sequence of operations being repeated several times over until a pile of plant-laden stakes of predetermined size has been accmulated upon the rear deck 88.

At that time, the operator stops the vehicle 10, turns and rolls the deck 88 along the tracks 90 and 92 to the outboard dumping position shown in phantom lines in FIG. 1. Upon reaching the outboard position, the deck 88 is free to tilt by gravity downwardly and rearwardly toward its dumping position as illustrated in FIG. 2 because the followers 94 of the front track 90 become aligned with the forwardly facing openings 96 thereof which clear the front followers 94 during such tilting action by the deck 88. The chain 100 limits rearward swinging of the deck 88, and the pile of plants and stakes slides gently to the ground where they remain in a neat pile substantially undisturbed from their condition on the deck 88. The operator then relevels the deck 88 to replace the front followers 94 in the front track 90, and he then rolls the deck 88 back leftwardly to its in-line position of FIG. 1, whereupon the harvesting procedure is resumed.

Note that positioning of the deck 88 to its outboard location prior to dumping prevents the plants from being dumped in a position where they will be run over by the vehicle during its next pass across the field. This, of course, is extremely important insofar as maintaining quality of the tobacco is concerned, and is a highly desirable feature of the present invention.

When the operator is approaching a plant row, or after completing a pass along such a row, he will doubtlessly find it necessary and desirable to steer the vehicle through the steering arm 74. However, once the guide rails 46 have been aligned with a plant row and begin to receive such plants of the row, steering should thereafter be effected automatically without the operator being required to use the steering arm 74 until the end of the row has been reached. Note in this regard that the rails 46, as a result of being relatively closely spaced, will engage the sides of the plants if the vehicle 10 becomes deviated slightly from its straight forward course of travel. Such pressure on the engaged guide rail 46 will cause the rails 46, U-shaped structural member 50 and the left front wheel 14 to swing as a unit about the upright pivot 54 in a direction necessary to correct the directional deviation of the vehicle 10. Such turning of the left front wheel 14 is of course likewise transmitted to the right front wheel 14 via the linkages 60 and 66 so that the vehicle 10 becomes reoriented to its proper direction of travel. Note that once heading in the proper direction, the directional pressure applied to the appropriate guide rail 46 by the plants is terminated, and the appropriate spring 68 or 70 returns the wheels 14 to their normal straight forwardly disposed condition as illustrated in FIG. 3.

Having thus described the invention, it should be apparent that it is indeed fully capable of achieving the goals and objectives set forth early in this description, as well as filling the long-felt need hereinabove explained. It is to be emphasized, however, that the method and apparatus hereinabove described represent only a prefered embodiment thereof and that many variations could be made by those skilled in the art without departing from the gist of the present invention. Accordingly, the invention should be limited only by the fair scope of the claims which follow.

We claim:

1. Apparatus for use in harvesting a field of tobacco plants arranged in a series of adjacent rows comprising:
   a chassis;
   ground-engaging wheels supporting the chassis for movement in a path of travel along a row of the plants;
   a deck for supporting and temporarily accumulating a stack of separate layers of staked-together plants after their severance from the ground; and
   means mounting said deck at the rear of the chassis for swinging movement between a stack supporting position in which the deck is generally horizontal and a stack dumping position in which the deck is inclined downwardly and rearwardly relative to said path of travel in disposition for discharging the stack onto the ground in rearward clearing relationship to said ground wheels,
   said mounting means including structure supporting said deck for shifting thereof from a retracted location generally within the lateral confines of the ground wheels while in said horizontal, supporting position for receiving the stack of plants to a laterally offset location projecting partly beyond said lateral confines of the ground wheels in preparation for swinging to said dumping position,
   said deck thereby being operable to place stacks onto the ground at sites which avoid overrunning thereof by the chassis when the latter moves in a harvesting pass along a next adjacent row of the plants.

2. Apparatus as claimed in claim 1, wherein said structure includes a pair of fore-and-aft spaced, laterally extending tracks on said chassis and corresponding fore-and-aft spaced track followers on said deck, one of said followers having transverse pivot means associated therewith for permitting said swinging of the deck.

3. Apparatus as claimed in 2, wherein said tracks are configured to confine said followers against escape, the track associated with the other of said followers having opening means therein corresponding to said laterally offset position of the deck and permitting temporary removal of said other follower from its associated track during said swinging of the deck.

* * * * *